(12) United States Patent
Moshfeghi

(10) Patent No.: US 10,069,608 B2
(45) Date of Patent: Sep. 4, 2018

(54) METHOD AND SYSTEM FOR MIMO TRANSMISSION IN A DISTRIBUTED TRANSCEIVER NETWORK

(71) Applicant: Golba LLC, Rancho Palos Verdes, CA (US)

(72) Inventor: Mehran Moshfeghi, Rancho Palos Verdes, CA (US)

(73) Assignee: GOLBA LLC, Rancho Palos Verdes, CA (US)

( * ) Notice: Subject to any disclaimer, the term of this patent is extended or adjusted under 35 U.S.C. 154(b) by 0 days.

(21) Appl. No.: 15/595,940

(22) Filed: May 15, 2017

(65) Prior Publication Data

US 2017/0317801 A1 Nov. 2, 2017

Related U.S. Application Data

(63) Continuation of application No. 14/980,281, filed on Dec. 28, 2015, now Pat. No. 9,686,060, which is a
(Continued)

(51) Int. Cl.
*H04B 7/02* (2018.01)
*H04L 5/00* (2006.01)
(Continued)

(52) U.S. Cl.
CPC ............. *H04L 5/0032* (2013.01); *H04B 1/40* (2013.01); *H04B 7/043* (2013.01); *H04B 7/0408* (2013.01);
(Continued)

(58) Field of Classification Search
CPC ....... H04L 1/06; H04L 1/0057; H04L 5/0023; H04L 5/00; H04L 2025/03426;
(Continued)

(56) References Cited

U.S. PATENT DOCUMENTS 3,618,097 A 11/1971 McLeod, Jr.
5,525,990 A 6/1996 Lewis
(Continued)

FOREIGN PATENT DOCUMENTS

WO WO 2013/058998 4/2013
WO WO 2013/058999 4/2013

OTHER PUBLICATIONS

U.S. Appl. No. 15/706,759, filed Sep. 17, 2017, Moshfeghi, Mehran.
(Continued)

*Primary Examiner* — Rahel Guarino
(74) *Attorney, Agent, or Firm* — Makoui Law, PC

(57) ABSTRACT

A transmitting device comprises a plurality of distributed transceivers, a baseband processor and a network management engine. Data streams are generated at baseband by the baseband processor. Diversity coding such as space-time coding may be performed over the generated data streams in the baseband. The transmitting device concurrently transmits each of the coded streams in a same radio frequency (RF) band to a receiving device over the entire distributed transceivers through associated antennas. When needed, the network management engine may identify one or more auxiliary devices providing available transceivers and antenna beamformers to the transmitting device for sharing. Beam patterns and antenna orientations may be determined for associated antennas of the available transceivers for the transmitting device. Each of the coded data streams in the same radio frequency band may be transmitted to the receiving device over the entire available transceivers for the transmitting device through the associated antennas.

24 Claims, 7 Drawing Sheets

Related U.S. Application Data continuation of application No. 13/473,113, filed on May 16, 2012, now Pat. No. 9,225,482.

(60) Provisional application No. 61/548,201, filed on Oct. 17, 2011.

(51) Int. Cl.

| | | |
|---|---|---|
| *H04L 27/12* | (2006.01) | |
| *H04B 7/0426* | (2017.01) | |
| *H04B 7/0408* | (2017.01) | |
| *H04B 7/0413* | (2017.01) | |
| *H04W 72/08* | (2009.01) | |
| *H04B 7/08* | (2006.01) | |
| *H04W 72/04* | (2009.01) | |
| *H04W 24/08* | (2009.01) | |
| *H04W 4/00* | (2018.01) | |
| *H04B 7/06* | (2006.01) | |
| *H04W 88/02* | (2009.01) | |
| *H04W 88/06* | (2009.01) | |
| *H04B 1/40* | (2015.01) | |
| *H04W 4/80* | (2018.01) | |
| *H04W 84/12* | (2009.01) | |

(52) U.S. Cl.
CPC ......... *H04B 7/0413* (2013.01); *H04B 7/0689* (2013.01); *H04B 7/0897* (2013.01); *H04L 27/12* (2013.01); *H04W 4/008* (2013.01); *H04W 4/80* (2018.02); *H04W 24/08* (2013.01); *H04W 72/046* (2013.01); *H04W 72/0453* (2013.01); *H04W 72/0473* (2013.01); *H04W 72/085* (2013.01); *H04W 88/02* (2013.01); *H04W 88/06* (2013.01); *H04W 84/12* (2013.01); *Y02B 60/50* (2013.01); *Y02D 70/00* (2018.01)

(58) Field of Classification Search
CPC ......... H04L 2025/03414; H04L 1/0656; H04L 1/0618; H04L 5/0032; H04L 27/12; H04W 72/042; H04W 72/046; H04W 72/04; H04W 88/02; H04W 72/0473; H04W 4/00; H04W 4/008; H04W 24/08; H04W 72/0453; H04W 72/085; H04W 72/08; H04W 88/06; H04W 84/12; H04B 7/06; H04B 7/04; H04B 1/56; H04B 7/068; H04B 7/0689; H04B 1/40; H04B 7/043; H04B 7/0897; H04B 7/08; H04B 7/0413; H04B 7/0408
See application file for complete search history.

(56) References Cited

U.S. PATENT DOCUMENTS

| | | | |
|---|---|---|---|
| 5,936,577 | A | 8/1999 | Shoki et al. |
| 6,018,316 | A | 1/2000 | Rudish et al. |
| 6,718,159 | B1 | 4/2004 | Sato |
| 6,802,035 | B2 | 10/2004 | Catreux et al. |
| 7,058,367 | B1 | 6/2006 | Luo et al. |
| 7,187,949 | B2 | 3/2007 | Chang et al. |
| 7,248,217 | B2 | 7/2007 | Mani et al. |
| 7,260,141 | B2 | 8/2007 | Bierly et al. |
| 7,574,236 | B1 | 8/2009 | Mansour |
| 7,636,573 | B2 | 12/2009 | Walton et al. |
| 7,688,909 | B2 | 3/2010 | Tsutsui |
| 7,689,216 | B2 | 3/2010 | Wandel et al. |
| 7,710,319 | B2 | 5/2010 | Nassiri-Toussi et al. |
| 7,890,114 | B2 | 2/2011 | Braun et al. |
| 7,904,117 | B2 | 3/2011 | Doan et al. |
| 7,986,742 | B2 | 7/2011 | Ketchum et al. |
| 8,098,752 | B2 | 1/2012 | Hwang et al. |
| 8,126,408 | B2 | 2/2012 | Ahrony et al. |
| 8,140,122 | B2 | 3/2012 | Park et al. |
| 8,160,601 | B2 | 4/2012 | Veselinovic et al. |
| 8,175,184 | B2 | 5/2012 | Kim |
| 8,203,978 | B2 | 6/2012 | Walton et al. |
| 8,279,132 | B2 | 10/2012 | Jung et al. |
| 8,280,445 | B2 | 10/2012 | Yong et al. |
| 8,320,304 | B2 | 11/2012 | Deb et al. |
| 8,364,188 | B2 | 1/2013 | Srinivasan et al. |
| 8,369,791 | B2 | 2/2013 | Hafeez |
| 8,385,305 | B1 | 2/2013 | Negus et al. |
| 8,385,452 | B2 * | 2/2013 | Gorokhov ............ H04L 1/0026 375/267 |
| 8,396,157 | B2 | 3/2013 | Li et al. |
| 8,570,988 | B2 | 10/2013 | Wallace et al. |
| 8,644,262 | B1 | 2/2014 | Sun et al. |
| 8,654,815 | B1 | 2/2014 | Forenza et al. |
| 8,750,264 | B2 | 6/2014 | Shatti |
| 8,780,943 | B2 | 7/2014 | Moshfeghi |
| 8,787,469 | B2 | 7/2014 | Kim |
| 8,817,678 | B2 | 8/2014 | Moshfeghi |
| 8,854,255 | B1 | 10/2014 | Ehret |
| 8,885,628 | B2 | 11/2014 | Palanki et al. |
| 9,037,094 | B2 | 5/2015 | Moshfeghi |
| 9,112,648 | B2 | 8/2015 | Moshfeghi |
| 9,185,601 | B2 | 11/2015 | Frerking |
| 9,197,982 | B2 | 11/2015 | Moshfeghi |
| 9,225,482 | B2 * | 12/2015 | Moshfeghi ............ H04W 88/06 |
| 9,226,092 | B2 | 12/2015 | Moshfeghi |
| 9,253,587 | B2 | 2/2016 | Moshfeghi |
| 9,438,389 | B2 | 9/2016 | Moshfeghi |
| 9,548,805 | B2 | 1/2017 | Moshfeghi |
| 9,602,257 | B2 | 3/2017 | Moshfeghi |
| 9,660,777 | B2 | 5/2017 | Moshfeghi |
| 9,680,554 | B2 | 6/2017 | Moshfeghi |
| 9,686,060 | B2 * | 6/2017 | Moshfeghi ............ H04W 88/06 |
| 9,698,948 | B2 | 7/2017 | Moshfeghi |
| 9,780,928 | B2 | 10/2017 | Moshfeghi |
| 2003/0012208 | A1 | 1/2003 | Bernheim et al. |
| 2003/0125040 | A1 | 7/2003 | Walton et al. |
| 2003/0129989 | A1 | 7/2003 | Gholmieh et al. |
| 2004/0077354 | A1 | 4/2004 | Jason et al. |
| 2004/0082356 | A1 | 4/2004 | Walton et al. |
| 2004/0095907 | A1 | 5/2004 | Agee et al. |
| 2004/0116129 | A1 | 6/2004 | Wilson |
| 2004/0166808 | A1 | 8/2004 | Hasegawa et al. |
| 2005/0048964 | A1 | 3/2005 | Cohen et al. |
| 2005/0088358 | A1 | 4/2005 | Larry et al. |
| 2005/0136943 | A1 | 6/2005 | Banerjee et al. |
| 2005/0181755 | A1 | 8/2005 | Hoshino et al. |
| 2005/0232216 | A1 | 10/2005 | Webster et al. |
| 2005/0237971 | A1 | 10/2005 | Skraparlis |
| 2005/0243756 | A1 | 11/2005 | Cleveland et al. |
| 2006/0063494 | A1 | 3/2006 | Zhang et al. |
| 2006/0121946 | A1 | 6/2006 | Walton et al. |
| 2007/0052519 | A1 | 3/2007 | Talty et al. |
| 2007/0093270 | A1 | 4/2007 | Lagnado |
| 2007/0100548 | A1 | 5/2007 | Small |
| 2007/0116012 | A1 | 5/2007 | Chang et al. |
| 2008/0166975 | A1 | 7/2008 | Kim et al. |
| 2008/0212582 | A1 | 9/2008 | Zwart et al. |
| 2008/0261509 | A1 | 10/2008 | Sen |
| 2008/0305820 | A1 | 12/2008 | Sadiq et al. |
| 2009/0093265 | A1 | 4/2009 | Kimura et al. |
| 2009/0156227 | A1 | 6/2009 | Frerking et al. |
| 2009/0325479 | A1 | 12/2009 | Chakrabarti et al. |
| 2010/0080197 | A1 | 4/2010 | Kanellakis et al. |
| 2010/0090898 | A1 | 4/2010 | Gallagher et al. |
| 2010/0105403 | A1 | 4/2010 | Lennartson et al. |
| 2010/0117890 | A1 | 5/2010 | Vook et al. |
| 2010/0124895 | A1 | 5/2010 | Martin et al. |
| 2010/0136922 | A1 | 6/2010 | Rofougaran |
| 2010/0172309 | A1 * | 7/2010 | Forenza ............... H04B 7/0684 370/329 |
| 2010/0220012 | A1 | 9/2010 | Reede |
| 2010/0273504 | A1 | 10/2010 | Bull et al. |
| 2010/0304680 | A1 | 12/2010 | Kuffner et al. |
| 2010/0304770 | A1 * | 12/2010 | Wietfeldt ............ H04W 72/1215 455/509 |

(56) References Cited

U.S. PATENT DOCUMENTS

| | | |
|---|---|---|
| 2010/0328157 A1 | 12/2010 | Culkin et al. |
| 2011/0002410 A1 | 1/2011 | Forenza et al. |
| 2011/0003610 A1 | 1/2011 | Key et al. |
| 2011/0069773 A1 | 3/2011 | Doron et al. |
| 2011/0105032 A1 | 5/2011 | Maruhashi et al. |
| 2011/0105167 A1 | 5/2011 | Pan et al. |
| 2011/0140954 A1 | 6/2011 | Fortuny-Guasch |
| 2011/0194504 A1 | 8/2011 | Gorokhov et al. |
| 2011/0212684 A1 | 9/2011 | Nam et al. |
| 2011/0299441 A1 | 12/2011 | Petrovic |
| 2012/0082070 A1 | 4/2012 | Hart et al. |
| 2012/0082072 A1 | 4/2012 | Shen |
| 2012/0083207 A1 | 4/2012 | Rofougaran et al. |
| 2012/0083225 A1 | 4/2012 | Rofougaran et al. |
| 2012/0083233 A1 | 4/2012 | Rofougaran et al. |
| 2012/0083306 A1 | 4/2012 | Rofougaran et al. |
| 2012/0093209 A1 | 4/2012 | Schmidt et al. |
| 2012/0120884 A1 | 5/2012 | Yu et al. |
| 2012/0129543 A1 | 5/2012 | Patel et al. |
| 2012/0149300 A1 | 6/2012 | Forster |
| 2012/0184203 A1 | 7/2012 | Tulino et al. |
| 2012/0194385 A1 | 8/2012 | Schmidt et al. |
| 2012/0230274 A1 | 9/2012 | Xiao et al. |
| 2012/0238202 A1 | 9/2012 | Kim et al. |
| 2012/0314570 A1 | 12/2012 | Forenza et al. |
| 2013/0040558 A1 | 2/2013 | Kazmi |
| 2013/0044028 A1 | 2/2013 | Lea et al. |
| 2013/0057447 A1 | 3/2013 | Pivit et al. |
| 2013/0095747 A1 | 4/2013 | Moshfeghi |
| 2013/0114468 A1 | 5/2013 | Hui et al. |
| 2013/0155891 A1 | 6/2013 | Dinan |
| 2014/0010319 A1 | 1/2014 | Baik et al. |
| 2014/0045541 A1 | 2/2014 | Moshfeghi |
| 2014/0241296 A1 | 8/2014 | Shattil |
| 2016/0211905 A1 | 7/2016 | Moshfeghi |
| 2017/0126374 A1 | 5/2017 | Moshfeghi |
| 2017/0156069 A1 | 6/2017 | Moshfeghi |
| 2017/0230099 A1 | 8/2017 | Moshfeghi |
| 2017/0279573 A1 | 9/2017 | Moshfeghi |
| 2017/0317734 A1 | 11/2017 | Moshfeghi |
| 2017/0338921 A1 | 11/2017 | Moshfeghi |

OTHER PUBLICATIONS

U.S. Appl. No. 15/853,537, filed Dec. 22, 2017, Moshfeghi, Mehran.
U.S. Appl. No. 15/893,626, filed Feb. 10, 2018, Moshfeghi, Mehran.
Portions of prosecution history of U.S. Appl. No. 13/473,083, dated Apr. 17, 2015, Moshfeghi, Mehran.
Portions of prosecution history of U.S. Appl. No. 14/709,136, dated Jun. 1, 2017, Moshfeghi, Mehran.
Portions of prosecution history of U.S. Appl. No. 15/616,911, dated Nov. 9, 2017, Moshfeghi, Mehran.
Portions of prosecution history of U.S. Appl. No. 13/473,096, dated Jul. 20, 2015, Moshfeghi, Mehran.
Portions of prosecution history of U.S. Appl. No. 14/813,058, dated Feb. 17, 2017, Moshfeghi, Mehran.
Portions of prosecution history of U.S. Appl. No. 13/473,105, dated Jul. 30, 2014, Moshfeghi, Mehran.
Portions of prosecution history of U.S. Appl. No. 14/455,859, dated Aug. 12, 2016, Moshfeghi, Mehran.
Portions of prosecution history of U.S. Appl. No. 15/229,135, dated Mar. 20, 2018, Moshfeghi, Mehran.
Portions of prosecution history of U.S. Appl. No. 13/473,113, dated Nov. 24, 2015, Moshfeghi, Mehran.
Portions of prosecution history of U.S. Appl. No. 14/980,281, dated May 17, 2017, Moshfeghi, Mehran.
Portions of prosecution history of U.S. Appl. No. 13/473,160, dated Sep. 5, 2017, Moshfeghi, Mehran.
Portions of prosecution history of U.S. Appl. No. 13/473,144, dated Dec. 7, 2017, Moshfeghi, Mehran.
Portions of prosecution history of U.S. Appl. No. 15/853,537, dated Dec. 22, 2017, Moshfeghi, Mehran.
Portions of prosecution history of U.S. Appl. No. 13/473,180, dated Jun. 11, 2014, Moshfeghi, Mehran.
Portions of prosecution history of U.S. Appl. No. 14/325,218, dated Apr. 20, 2017, Moshfeghi, Mehran.
Portions of prosecution history of U.S. Appl. No. 15/472,148, dated Oct. 4, 2017, Moshfeghi, Mehran.
Portions of prosecution history of U.S. Appl. No. 13/919,958, dated Jan. 6, 2016, Moshfeghi, Mehran.
Portions of prosecution history of U.S. Appl. No. 13/919,932, dated Feb. 28, 2018, Moshfeghi, Mehran.
Portions of prosecution history of U.S. Appl. No. 13/919,967, dated Nov. 20, 2015, Moshfeghi, Mehran.
Portions of prosecution history of U.S. Appl. No. 14/980,338, dated Oct. 31, 2017, Moshfeghi, Mehran.
Portions of prosecution history of U.S. Appl. No. 13/919,922, dated Oct. 27, 2015, Moshfeghi, Mehran.
Portions of prosecution history of U.S. Appl. No. 14/940,130, dated May 4, 2017, Moshfeghi, Mehran.
Portions of prosecution history of U.S. Appl. No. 15/595,919, dated Nov. 9, 2017, Moshfeghi, Mehran.
Portions of prosecution history of U.S. Appl. No. 13/919,972, dated Dec. 20, 2016, Moshfeghi, Mehran.
Portions of prosecution history of U.S. Appl. No. 15/372,417, dated Jul. 28, 2017, Moshfeghi, Mehran.
Portions of prosecution history of U.S. Appl. No. 15/441,209, dated Jan. 2, 2018, Moshfeghi, Mehran.
Portions of prosecution history of U.S. Appl. No. 15/893,626, dated Jul. 28, 2017, Moshfeghi, Mehran.
International Search Report and Written Opinion of PCT/US2012/058839, dated Jan. 4, 2013, Golba LLC.
International Search Report and Written Opinion of PCT/US2012/058842, dated Jan. 4, 2013, Golba LLC.

* cited by examiner

METHOD AND SYSTEM FOR MIMO TRANSMISSION IN A DISTRIBUTED TRANSCEIVER NETWORK

CROSS-REFERENCE TO RELATED APPLICATIONS/INCORPORATION BY REFERENCE

This patent application is a continuation application of U.S. patent application Ser. No. 14/980,281, filed Dec. 28, 2015, published as U.S. Patent Publication 2016/0197665. U.S. patent application Ser. No. 14/980,281 is a continuation application of U.S. patent application Ser. No. 13/473,113, filed May 16, 2012, issued as U.S. Pat. No. 9,225,482. U.S. patent application Ser. No. 13/473,113 makes reference to, claims priority to and claims benefit from U.S. Provisional Patent Application Ser. No. 61/548,201 filed on Oct. 17, 2011. U.S. patent application Ser. No. 14/980,281, published as U.S. Patent Publication 2016/0197665 and U.S. patent application Ser. No. 13/473,113, issued as U.S. Pat. No. 9,225,482 are incorporated herein by reference.

This application makes reference to:
U.S. application Ser. No. 13/473,096, filed on May 16, 2012, now issued as U.S. Pat. No. 9,112,648;
U.S. application Ser. No. 13/473,144, filed on May 16, 2012, now published as U.S. Patent Publication 2013-0095747;
U.S. application Ser. No. 13/473,105, filed on May 16, 2012, now issued as U.S. Pat. No. 8,817,678;
U.S. application Ser. No. 13/473,160, filed on May 16, 2012, now issued as U.S. Pat. No. 9,780,928;
U.S. application Ser. No. 13/473,180, filed on May 16, 2012, now issued as U.S. Pat. No. 8,780,943; and U.S. application Ser. No. 13/473,083, filed on May 16, 2012 now issued as U.S. Pat. No. 9,037,094.

Each of the above stated applications is hereby incorporated herein by reference in its entirety.

FIELD OF THE INVENTION

Certain embodiments of the invention relate to signal processing for communication systems. More specifically, certain embodiments of the invention relate to a method and system for MIMO transmission in a distributed transceiver network.

BACKGROUND OF THE INVENTION

Millimeter Wave (mmWave) devices are being utilized for high throughput wireless communications at very high carrier frequencies. There are several standards bodies such as, for example, 60 GHz wireless standard, WirelessHD, WiGig, and WiFi IEEE 802.11ad that utilize high frequencies such as the 60 GHz frequency spectrum for high throughput wireless communications. In the US, the 60 GHz spectrum band may be used for unlicensed short range data links such as data links within a range of 1.7 km, with data throughputs up to 6 Gbits/s. These higher frequencies may provide smaller wavelengths and enable the use of small high gain antennas. However, these higher frequencies may experience high propagation loss.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for MIMO transmission in a distributed transceiver network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for Multi-Input Multi-Output (MIMO) transmission in a distributed transceiver network. In accordance with various exemplary embodiments of the invention, a transmitting device in a network comprises a plurality of distributed transceivers, a central baseband processor and a network management engine. The central baseband processor may generate data streams at baseband. Diversity coding such as, for example, space-time coding, space-time-frequency coding, orthogonal space-time coding, spatial multiplexing, or multi-user MIMO (MU-MIMO) coding may be performed over the generated data streams at baseband. The transmitting device may concurrently transmit each of the coded streams in a same radio frequency (RF) band to a receiving device over the distributed transceivers through associated antennas. The coded data streams in the baseband may be initially converted into different corresponding intermediate frequency (IF) bands and may be further converted into the same RF band for transmission. The network management engine may determine corresponding beam patterns and antenna orientations in the same RF band for the associated antennas of the distributed transceivers of the transmitting device. The coded streams in the same RF band may be concurrently transmitted to the receiving device over the distributed transceivers through associated antennas with the determined corresponding beam patterns and antenna orientations. When needed, the network management engine may identify auxiliary devices that may provide transceivers and antenna beamformers to the transmitting device for sharing. Beam patterns and antenna orientations may be determined for associated antennas of both the distributed transceivers of the transmitting device and the shared transceivers of the auxiliary devices. Each of the coded data streams in the same radio frequency band may be transmitted to the receiving device over the entire collection of the available transceivers for the transmitting device utilizing the determined corresponding beam patterns and antenna orientations for the associated antennas.

Figure 1:
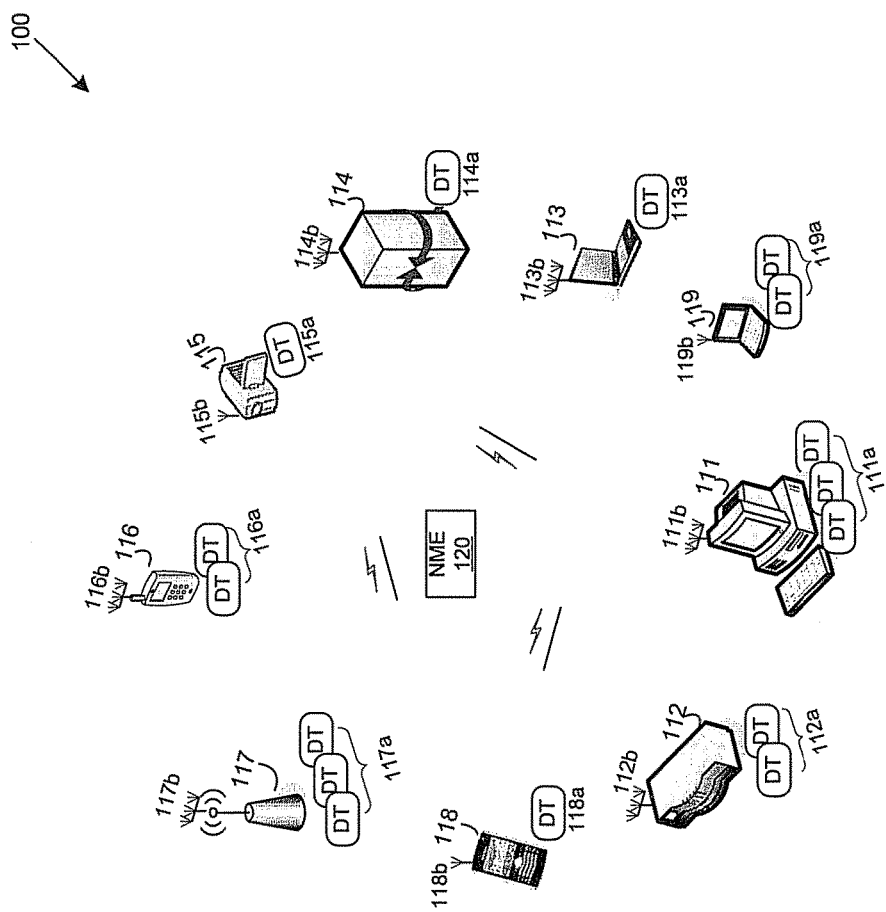
FIG. 1 is a block diagram illustrating an exemplary communication system that utilizes transmit beamforming for MIMO transmission in a centralized managed distributed transceiver network, in accordance with an embodiment of the invention.

FIG. 1 is a block diagram illustrating an exemplary communication system that utilizes transmit beamforming for MIMO transmission in a centralized managed distributed transceiver network, in accordance with an embodiment of the invention. Referring to FIG. 1, there is shown a communication network 100 comprising a plurality of application devices, of which application devices 111-119 are displayed.

The application devices 111-119 may comprise suitable logic, circuitry, code, and/or interfaces that may be operable to communicate voice and data with one to another over wired and/or wireless connections. In an exemplary embodiment of the invention, each of the application devices 111-119 in the communication network 100 may comprise one or more distributed transceivers (DTs) for communication in the communication network 100. For example, distributed transceivers 111a through 119a may be integrated in the application devices 111 through 119, respectively, and utilized for receiving and transmitting signals. Each distributed transceiver may be equipped with an independently configurable antenna or antenna array that is operable to transmit and receive signals over the air. For example, the distributed transceivers 111a each may be equipped with an independently configurable antenna array 111b, and the distributed transceiver 118a, however, may be equipped with a single independently configurable antenna 118b to transmit and receive signals over the air. Depending on device capabilities and user preferences, distributed transceivers such as the distributed transceivers 111a within the application device 111 may comprise radios such as, for example, a millimeter Wave (mmWave) radio, a WLAN radio, a WiMax radio, a Bluetooth radio, a Bluetooth Low Energy (BLE) radio, cellular radios, or other types of radios. In this regard, radios such as mmWave radios may be utilized at very high carrier frequencies for high throughput wireless communications.

In an exemplary operation, the distributed transceivers 111a through 119a in the communication network 100 are physically positioned and oriented at different locations within corresponding application devices such like laptop, TV, gateway and/or set-top box. The distributed transceivers 111a through 119a may be centrally managed by a single network management engine (NME) 120 of the communication network 100. In an exemplary embodiment of the invention, the network management engine 120 may reside within a specific application device in the communication network 100. The network management engine 120 may be centralized as a full software implementation on a separate network microprocessor, for example. An application device in the communication network 100 may act or function as a master application device or an end-user application device. An application device that comprises the network management engine 120 and/or may have access to manage or control the network management engine 120 to dynamically configure and manage operation of the entire distributed transceivers in the communication network 100 is referred to a master application device. An application device that does not comprise the network management engine 120 and/or may have no access to manage or control the network management engine 120 is referred to as an end-user application device.

In some instances, the application device 111 acts as a master application device in the communication network 100. In an exemplary embodiment of the invention, the network management engine 120 in the master application device 111 may be utilized to configure, control, and manage the entire distributed transceivers 111a through 119a in the communication network 100 to optimize network performance. The application devices 111-119 each may operate in a transmission mode or in a receiving mode. In instances where the master application device 111 is transmitting multimedia information such as, for example, images, video, voice, as well as any other form of data to one or more receiving devices such as, for example, the end-user application devices 112-116, the distributed transceivers 111a of the master application device 111 may be managed to transmit data streams to the end-user application devices 112-116 utilizing various transmission schemes such as, for example, multiple-input-multiple-output (MIMO) transmission. In an exemplary embodiment of the invention, transmit beamforming may be utilized by the distributed transceivers 111a for MIMO transmission. In this regard, each of the data streams may be concurrently transmitted in a same RF band over the full collection of the distributed transceivers 111a of the master application device 111 to a single intended receiving device such as the end-user application device 112.

In an exemplary embodiment of the invention, the network management engine 120 in the master application device 111 may be enabled to monitor and collect corresponding communication environment information or characteristics from the end-user application devices 112-116. The collected communication environment information may comprise, for example, propagation environment conditions, link quality, device capabilities, antenna polarization, radiation pattern, antenna spacing, array geometry, device locations, target throughput, and/or application quality of service (QoS) requirements reported. The network management engine 120 may be operable to dynamically configure the distributed transceivers 111a-116a and associated antennas or antenna arrays 111b-116b, and to coordinate and manage the operation of the distributed transceivers 111a-116a and associated antennas or antenna arrays 111b-116b based on the collected communication environment information.

In the collected communication environment information, the link quality may comprise signal-to-noise ratios (SNR) at different transceivers, and/or signal-to-leakage-noise ratios (SLNR) at different devices and transceivers. The application device capabilities may comprise, for example, battery life, a number of transceivers, a number of antennas per transceiver, antenna beamformers, device interface types, processing protocols, service types, service classes and/or service requirements. The interface types for the application devices 111-119 may comprise access interface types such as, for example, Multimedia over Coax Alliance (MoCa), WiFi, Bluetooth, Ethernet, Femtocell, and/or cordless. The processing protocols may comprise service layer protocols, IP layer protocols and link layer protocols, as specified, for example, in the Open Systems Interconnect (OSI) model. The service layer protocols may comprise, for example, secure protocols such as Secure Sockets Layer (SSL) and control protocols such as Spanning Tree Protocol (STP). The IP layer protocols may comprise IP signaling protocols such as, for example, SIP and H.323, and IP media transport protocols such as, for example, TCP, UDP, RTP, RTC and RTCP. The link layer protocols may comprise technology-specific PHY and MAC layer protocols such as, for example, Multimedia over Coax Alliance (MoCa), WiFi, Ethernet, Femtocell, and/or cordless.

Although communication among the application devices 111-119 with one or more distributed transceivers is illustrated in FIG. 1, the invention may not be so limited. Accordingly, an application device may be operable to utilize one or more associated distributed transceivers to communicate with one or more application devices with normal transceivers (non-distributed transceivers) without departing from the spirit and scope of various embodiments of the invention.

Figure 2:
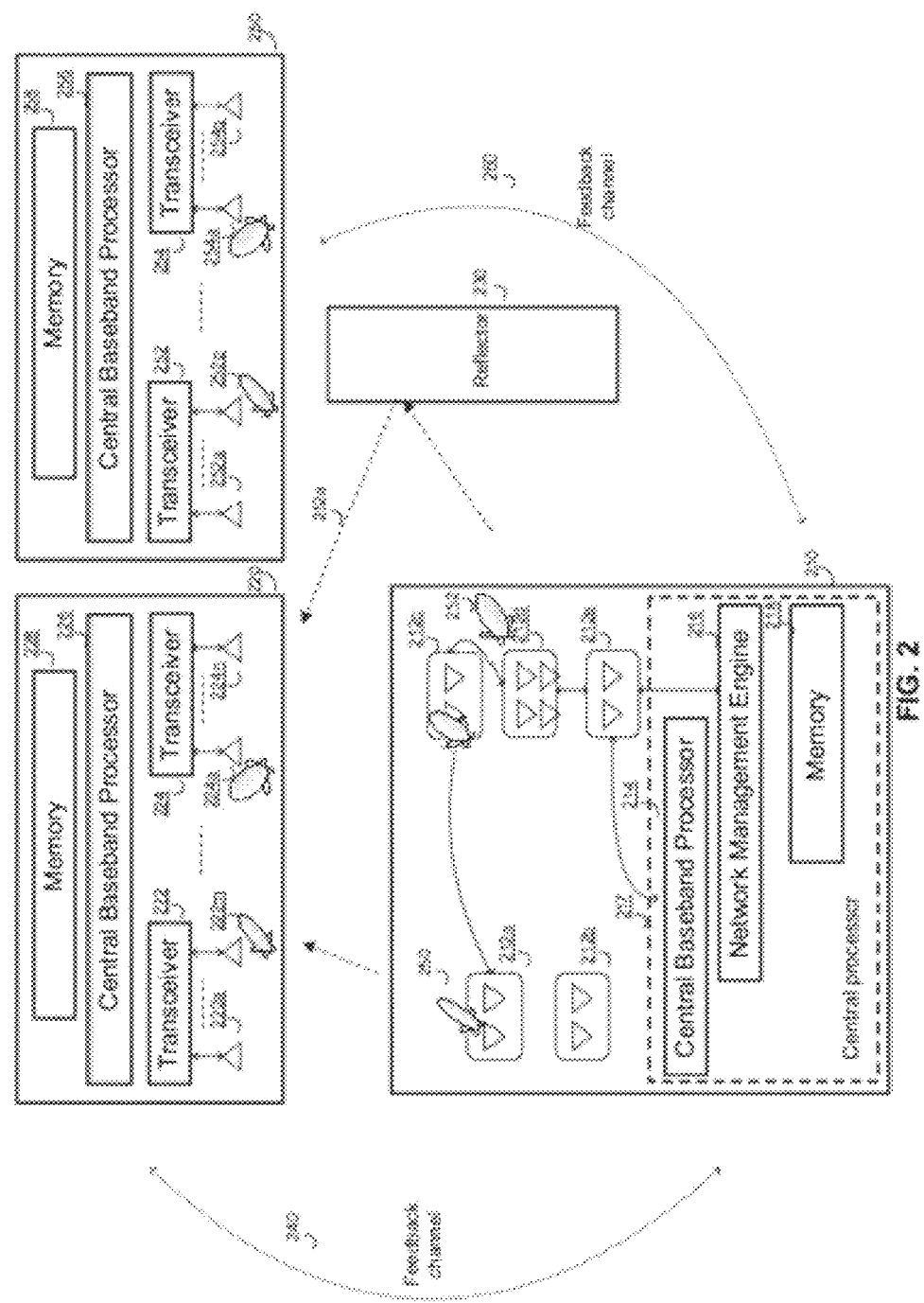
FIG. 2 is a diagram that illustrates an exemplary usage scenario where transmit beamforming is performed at a transmitter with a collection of distributed transceivers for MIMO transmission to one receiving device, in accordance with an embodiment of the invention.

FIG. 2 is a diagram that illustrates an exemplary usage scenario where transmit beamforming is performed at a transmitter with a collection of distributed transceivers for MIMO transmission to one receiving device, in accordance with an embodiment of the invention. Referring to FIG. 2, there is shown a master application device 210 and end-user application devices 220 and 250.

The master application device 210 may comprise suitable logic, circuitry, interfaces and/or code that may be operable to communicate multimedia information such as, for example, images, video, voice, as well as any other forms of data with one or more application devices such as the end-user application device 220. The master application device 210 may comprise a collection of distributed transceivers 212a through 212e, and a central processor 217 that comprises a central baseband processor 214, a network management engine 216 and a memory 218. In an exemplary embodiment of the invention, each of the collection of distributed transceivers 212a through 212e may be physically positioned and oriented at different locations within an application device such as, for example, a laptop, TV, gateway, and set-top box. In this regard, the collection of distributed transceivers 212a through 212e may be implemented in various ways such as, for example, a single distributed transceiver integrated in a single chip package; multiple silicon dies on one single chip; and multiple distributed transceivers on a single silicon die. Depending on device capabilities and user preferences, the distributed transceivers 212a-212e may be oriented in a fixed direction or multiple different directions. In another exemplary embodiment of the invention, the collection of distributed transceivers 212a-212e may be operable to receive and/or transmit radio frequency signals from and/or to the end-user application device 220 using air interface protocols specified in UMTS, GSM, LTE, WLAN, 60 GHz/mmWave, and/or WiMAX, for example.

The central baseband processor 214 may comprise suitable logic, circuitry, interfaces and/or code that may be operable to perform baseband digital signal processing needed for transmission and receiving operation of the entire collection of distributed transceivers 212a through 212e. For example, the central baseband processor 214 may be operable to perform waveform generation, equalization, and/or packet processing associated with the operation of the collection of distributed transceivers 212a through 212e. In addition, the central baseband processor 214 may be operable to configure, manage and control orientations of the distributed transceivers 212a-212e.

In an exemplary embodiment of the invention, during MIMO transmission to a receiving device such as the end-user application device 220, the central baseband processor 214 of the master application device 210 may generate data streams in a baseband such as a cellular baseband. The central baseband processor 214 may initially convert the data streams in the baseband into corresponding different IF bands. The data streams in the different IF bands may be further converted into a same RF band for transmission over the air. In this regard, the data streams in the same RF band may be transmit processed through transmit beamforming, for example, such that each of the data streams in the same RF band may be concurrently transmitted over the full collection of the distributed transceivers 212a-212e of the master application device 210 to the single end-user application device 220. In this scenario, each full transceiver 212a-212e may act or function as a path of MIMO coding (in this example, forming a MIMO system with 5 transmitter paths). However, unlike traditional MIMO system, there is an additional degree of programmability in this distributed system. In a traditional MIMO system, each branch/antenna/path in transmitter/receiver has an omnidirectional profile. In this system disclosed in the present invention, each path in transmit/receive chain may be configured through its beamforming weights to result in a different pattern. In this mode of operation, the overall system comprises two layers of programming and coding design. The first level involves the MIMO coding design, assuming 5 transmit paths 212a-212e are available. The second level involves beamforming weights for the 5 antenna arrays within 212a-212e transceivers. In some embodiments of the invention, the above two levels of programming may be decoupled and designed independently (for ease of implementation and processing). In this case, the MIMO coding and waveforms may be generated assuming the 5 paths have omnidirectional response (enabling reuse of existing MIMO waveforms and codes). In other embodiments of the invention, these two levels of design/configurations are conducted jointly for a more globally optimal configuration. For example, if an orthogonal space-time block-code (OSTBC) is used as the MIMO coding, the beamforming patterns of 212a-212e are configured such that the effective propagation responses seen by the equivalent MIMO system are as much uncorrelated as possible, hence increasing OSTBC code's performance.

The network management engine 216 may comprise suitable logic, circuitry, interfaces and/or code that may be operable to monitor and collect communication environment information such as, for example, propagation environment conditions, link quality, application device capabilities, antenna polarization, radiation pattern, antenna spacing, array geometry, transmitter/receiver locations, target throughput, and/or application QoS requirements. The network management engine 216 may utilize the collected communication environment information to configure system, network and communication environment conditions as needed. For example, the network management engine 216 may be operable to perform high level system configurations such as, for example, the number of transceivers that are activated, the number of application devices that are being communicated with, adding/dropping application devices to the communication network 100. As shown in FIG. 2, the network management engine 216 is residing in the master application device 210. However, in some embodiments the network management engine 216 may reside on different network devices such as, for example, separate network microprocessors and servers on the communication network 100. The network management engine 216 may comprise a full software implementation, for example. In addition, the functionality of the network management engine 216 may be distributed over several devices in the communication network 100. In some embodiments the network management engine 216 may be operable to manage communication sessions over the communication network 100. In this regard, the network management engine 216 may be operable to coordinate operation of baseband processors in the communication network 100 such that various baseband processing may be split or shared among the baseband processors. For example, the network management engine 216 may enable multiple central baseband processors such as, for example, the central baseband processor 214 and the central baseband processor 226 for parallel baseband processing in order to increase throughput if needed.

In some embodiments of the invention, a single device, the master application device 210, the end-user application device 220, or the end-user application device 250, for example, may be configured to deploy a number of baseband processors to implement the system and data processing requirements/demands. For example, several baseband processors may be deployed within the single device to generate and/or decode different data streams transmitted/received by several distributed transceivers. In this configuration, the network management engine 216 may also be operable to control and coordinate the operation of the multiple baseband processors within the single device. In this regard, several internal connection topologies may be used or implemented. In some embodiments of the invention, each baseband processor in the single device may be dedicated to a subset of distributed transceivers and either ring/star topologies may be used. In this case, there may be no data transfer between the subsets of distributed transceivers. In another embodiment of the invention, the entire baseband processors and distributed transceivers within the single device may be connected together through a ring topology (using a single cable). In this case, the baseband processors within the single device may be coordinated to share the cable by time-multiplexed at the same IF frequency or frequency-multiplexed at different IF frequencies methods. The baseband processors within the single device may have different power/processing/communication characteristics. In some embodiments of the invention, one or more baseband processors that are most suitable for a mode of operation (e.g., lower power consumption meeting the throughput requirement) may be activated and other baseband processors may be disabled for power saving.

The memory 218 may comprise suitable logic, circuitry, interfaces and/or code that may be operable to store information such as, for example, executable instructions and data that may be utilized by the central baseband processor 214 and/or other associated component units such as the network management engine 216. The memory 218 may comprise RAM, ROM, low latency nonvolatile memory such as, for example, flash memory and/or other suitable electronic data storage.

End-user application devices such as the end-user application device 220 may comprise suitable logic, circuitry, interfaces and/or code that may be operable to communicate multimedia information such as, for example, images, video, voice, as well as any other forms of data with one or more application devices such as the master application device 210. The end-user application device 220 may comprise transceivers 222 through 224, and a central baseband processor 226, and a memory 228. In an exemplary embodiment of the invention, each of the transceivers 222 through 224 may be a normal transceiver (non-distributed transceivers) or a distributed transceiver. The transceivers 222 through 224 may be equipped with antenna arrays 222a-222m, and 224a-224n, respectively. Depending on device capabilities and user preferences, the transceivers 222 through 224 may be oriented in a fixed direction or multiple different directions. The transceivers 222 through 224 may be operable to receive and/or transmit radio frequency signals from and/or to the master application device 210 using air interface protocols specified in UMTS, GSM, LTE, WLAN, 60 GHz/mmWave, and/or WiMAX, for example. In an exemplary embodiment of the invention, the end-user application device 220 may receive a data stream that may be concurrently transmitted by the master application device 210 over the full collection of associated distributed transceivers 212a through 212e.

The central baseband processor 226 may comprise suitable logic, circuitry, interfaces and/or code that may be operable to perform baseband digital signal processing needed for transmission and receiving operation of the entire collection of transceivers 222 through 224. For example, the central baseband processor 226 may be operable to perform waveform generation, equalization, and/or packet processing associated with the operation of the transceivers 222 through 224. In addition, the central baseband processor 226 may be instructed or signaled by the network management engine 216 to configure, manage and control orientations of the transceivers 222 through 224.

The memory 228 may comprise suitable logic, circuitry, interfaces and/or code that may be operable to store information such as, for example, executable instructions and data that may be utilized by the central baseband processor 226 and/or other associated component units such as, for example, weight coefficients for the antenna arrays 222a-222m, and 224a-224n. The memory 228 may comprise RAM, ROM, low latency nonvolatile memory such as, for example, flash memory and/or other suitable electronic data storage.

In an exemplary operation, a wireless link may be established between the master application device 210 and the end-user application device 220 through a reflector 230. U.S. application Ser. No. 13/473,096, now published as U.S. Patent Publication 2013-0094439, which is filed on even date herewith discloses one or more reflectors that may be used to transmit one data stream or multiple data streams, and is hereby incorporated herein by reference in its entirety.

The master application device 210 may communicate multimedia information such as, for example, images, video, voice, as well as any other form of data with the end-user application device 220 utilizing the wireless link. In an exemplary embodiment of the invention, the master application device 210 may transmit the multimedia information to the end-user application device 220 utilizing MIMO transmission. In this regard, the central baseband processor 214 may be operable to generate a plurality of data streams in a baseband such as a cellular baseband. The central baseband processor 214 may encode the data streams in the baseband utilizing various diversity coding algorithms such as, for example, space-time coding or space-time-frequency coding. The coded data streams in the baseband may be initially converted into different corresponding IF bands and then may be further up-converted to the same radio frequency (RF) band. The central baseband processor 214 may be configured to enable transmit beamforming for MIMO transmission such that each of the coded data stream in the same RF band may be concurrently transmitted at different directions or orientations over the full collection of distributed transceivers 212a-212e of the master application device 210 to the single end-user application device 220.

During the MIMO transmission, the master application device 210 may continuously monitor and collect corresponding communication environment information such as, for example, propagation environment conditions, link quality, device capabilities, locations, target throughput, and/or application QoS requirements reported from the end-user application device 220. In this regard, a feedback channel 240 may be utilized to exchange and negotiate system configurations such as, for example, number of transceivers within devices, number of antennas per transceivers, antenna beamformers, the measured channel responses, the sequence of antenna array coefficients being evaluated, and/or device location.

The network management engine 216 may dynamically configure, coordinate and manage the transceivers 212a-212e, 222, and 224, and associated antennas or antenna arrays based on the collected corresponding communication environment information supplied from the end-user application device 220. For example, in instances where the master application device 210 does not have enough communication capabilities, for example, a number of transceivers and beamformers, to support the MIMO transmission, the network management engine 216 may be operable to identify one or more auxiliary devices that may provide available communication capacity to the master application device 210 for sharing. For example, in some instances the end-user application device 250 may be selected by the network management engine 216 as an auxiliary device for the master application device 210. Once the end-user application device 250 agrees to share the associated antennas 252a-252p, for example, with the master application device 210, the network management engine 216 may coordinate and configure the full collection of the transceivers 212a-212e of the master application device 210 and the auxiliary transceiver 252 of the auxiliary end-user application device 250 forming an extended MIMO system at the master application device 210. In this regard, the network management engine 216 and the central baseband processor 214 may enable transmit beamforming over the full collection of the transceivers 212a-212e and 252 in the extended MIMO system at the master application device 210. Each coded data stream may be concurrently transmitted at different directions or orientations over the full collection of the available transceivers 212a-212e and 252 through associated antennas in the same RF band to the single end-user application device 220.

Figure 3:
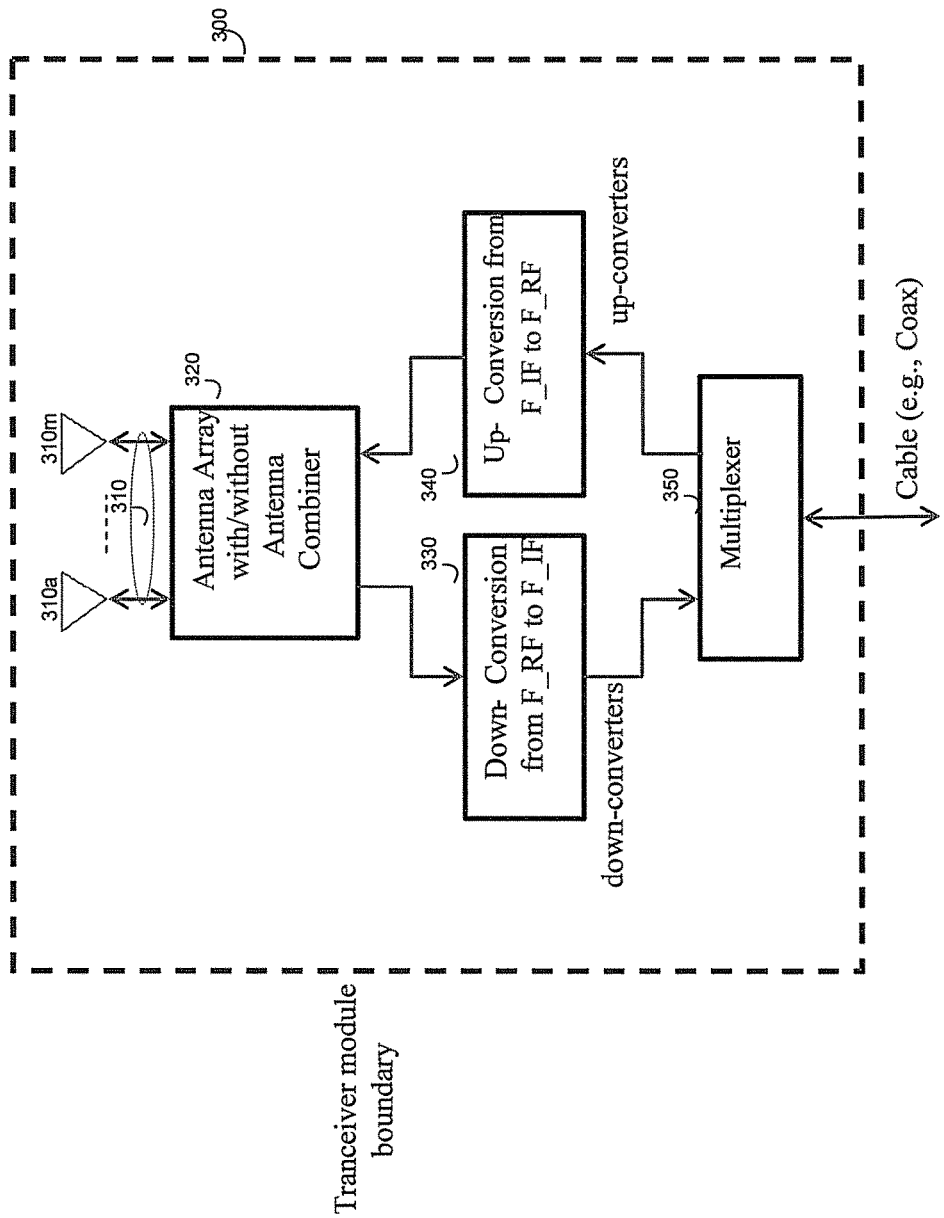
FIG. 3 is a diagram that illustrates an exemplary transceiver module that performs transmit beamforming for MIMO transmission to one receiving device, in accordance with an embodiment of the invention.

FIG. 3 is a diagram that illustrates an exemplary transceiver module that performs transmit beamforming for MIMO transmission to one receiving device, in accordance with an embodiment of the invention. Referring to FIG. 3, there is shown a transceiver 300 comprising an antenna array 310, an antenna array with/without antenna combiner 320, down-converters 330, up-converters 340, and a multiplexer 350.

In an exemplary operation, the antenna array 310 may comprise suitable logic, circuitry, interfaces and/or code that may be operable to transmit and receive radio frequency (RF) signals over the air. For reception, the transceiver 300 may pass a receive signal from the antenna array 310 after down-conversion to the central baseband processor 214. For transmission the transceiver 300 may be operable to receive transmit signals or data streams from the central baseband processor 214.

In an exemplary embodiment of the invention, the transmit data streams may be provided from the central baseband processor 214 by encoding corresponding baseband data streams utilizing space-time coding or space-time-frequency coding. The central baseband processor 214 may initially convert the coded data streams in the baseband to different corresponding IF bands. The transmit data streams in the different corresponding IF bands may be fed into the up-converters 340. The up-converters 340 may be operable to convert the transmit data streams in different IF bands to the antenna array 310 in a same RF band for transmission over the air. In an exemplary embodiment of the invention, antennas 310a-310m of the antenna array 310 may be arranged at different directions or orientations based on corresponding communication environment information. The central baseband processor 214 may perform transmit beamforming such that each of the transmit data streams may be concurrently transmitted in the same RF band over the antennas 310a-310m to the single end-user application device 220.

In some embodiments of the invention, the device 210 may be configured to implement a two-layer beamforming scheme as a special case of MIMO processing. In this regard, assume that the distributed transceivers 212a-212e may be configured to certain beam patterns. The central baseband processor 214 then considers each transceiver as a single antenna in forming a second layer of beamforming. For example, the baseband processor 214 and the NME 216 may formulate a standard beamforming problem with 5 available antennas, that is, the distributed transceivers 212a-212e may be treated as an equivalent antenna. The equivalent propagation channel responses corresponding to each transceiver may be measured and collected by the NME 216. Then, the system configuration becomes equivalent to a 5-antenna beamforming system where the channel responses of each antenna is available to the system. Existing beamforming algorithms such as maximal-ratio-combining (MRC), eigenvalue-decomposition (EVD), and singular-value-decomposition (SVD) methods may be used to derive the complex weighting factors used by the baseband processor 214 for scaling the signals delivered to each transceiver.

The multiplexer 350 may comprise suitable logic, circuitry, interfaces and/or code that may be operable to multiplex the transmit signal received from the central baseband processor 214 and the receive signal supplied from the antenna array 310. In this regard, the multiplexer 350 may utilize either time-division-multiplexing or frequency-domain-multiplexing to communicate the transmit signal and the receive signal over the same medium such as a cable.

The antenna array with/without antenna combiner 320 may comprise suitable logic, circuitry, interfaces and/or code that may be operable to scale and/or phase-shift signals before the down-converters 330 and/or signals after the up-converters 340. For example, in transmission operation the signal provided by the up-converters 340 may be phase-shifted by the shifter by different values. The resulting phase-shifted signals may be fed to different antenna elements within the antenna array 310. In another embodiment of the invention, the antenna array 310 may be oriented in a fixed direction or multiple different directions depending on antenna types and user preferences. For example, the antenna array 310 may be implemented as a fixed directional antenna array to provide maximal directionality (with no explicit combiner). The same two modules, that is, the antenna array 310 and the antenna array with/without antenna combiner 320, may be correspondingly utilized in a reception operation for the transceiver 300. In an exemplary embodiment of the invention, the operation of the antenna array with/without antenna combiner 320 may be managed or programmed by the network management engine 216.

The down-converters 330 may comprise suitable logic, circuitry, interfaces and/or code that may be operable to translate a radio frequency (RF) received from the antenna array 310 to an intermediate-frequency (IF) signal during reception. The up-converters 340 may comprise suitable logic, circuitry, interfaces and/or code that may be operable to translate an intermediate-frequency (IF) signal of a corresponding baseband signal supplied from the central baseband processor 214, for example to a RF signal during transmission.

In an exemplary embodiment of the invention, transceiver modules such as the transceiver 300 may be operable to perform a carrier frequency conversion or translation from F_IF (intermediate frequency) to F_RF (radio frequency) and vice versa. As an example, the network management engine 216 may select F_IF in the range of a few GHz, and may select F_RF in the range of 60 GHz, respectively. In a special case the input/output frequency of the transceiver 300 may be the same, that is, no frequency up-conversion is performed. In this special case the transceiver 300 may only perform signal amplification and feeding of signals into the antenna array 310.

Figure 4:
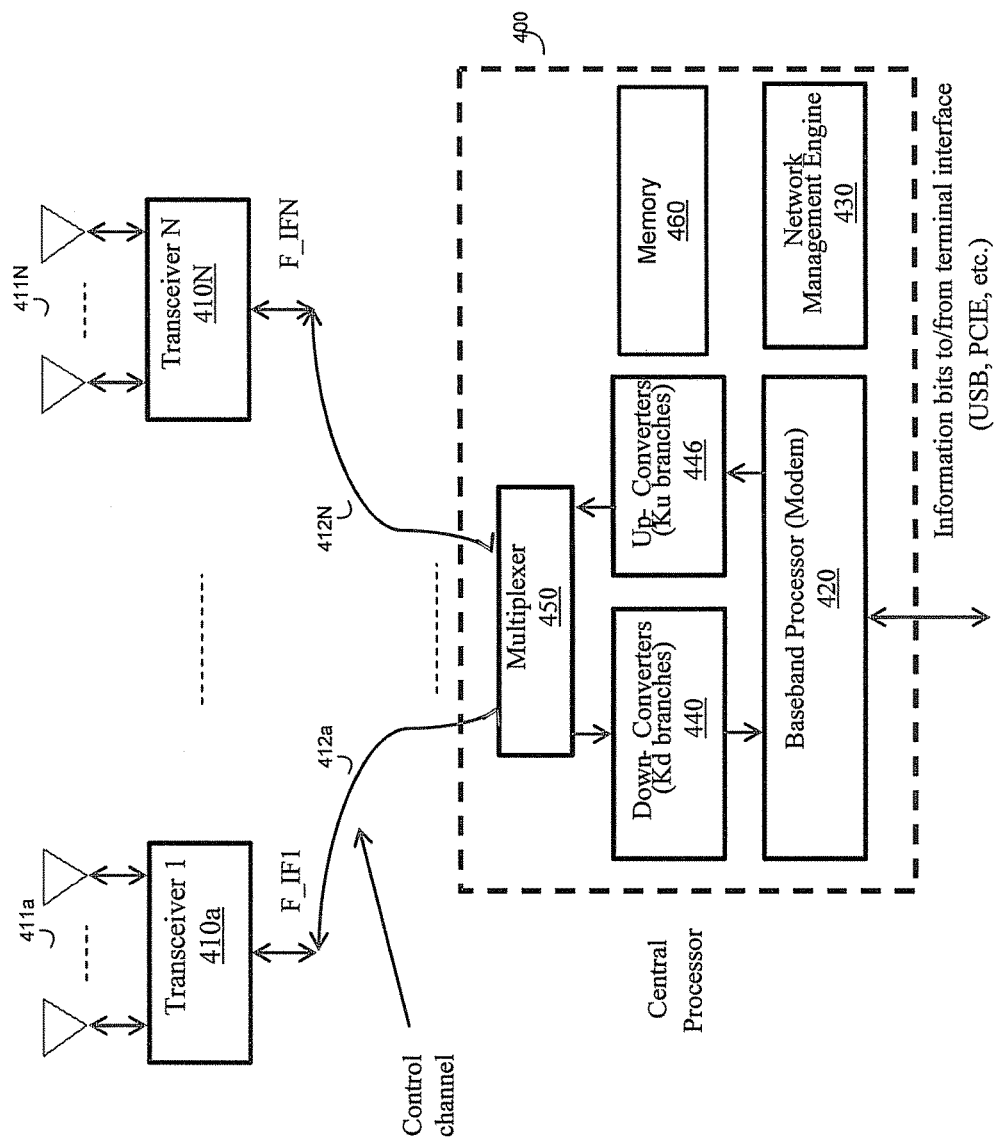
FIG. 4 is a diagram illustrating an exemplary application device with a collection of distributed transceivers that are implemented in a star topology, in accordance with an embodiment of the invention.

FIG. 4 is a diagram illustrating an exemplary application device with a collection of distributed transceivers that are implemented in a star topology, in accordance with an embodiment of the invention. Referring to FIG. 4, there is shown a central processor 400 that is connected to a collection of transceivers 410a through 410N. As shown, the collection of transceivers 410a through 410N are connected to the central processor 400 in a star topology with direct separate cables, for example, from the central processor 400 to each of the collection of transceivers 410a through 410N.

The central processor 400 comprises a baseband processor 420, a network management engine 430, down-converters 440, up-converters 446, a multiplxer 450 and a memory 460. The baseband processor 420 may comprise suitable logic, circuitry, interfaces and/or code that may be operable to provide MODEM functionality. In this regard, the central processor 400 may be operable to perform various baseband digital processing such as, for example, MIMO, OFDM, channel coding, HARQ, channel estimation and equalization, Timing/Carrier recovery and synchronization. The network management engine 430 may operate in substantially the same manner as the network management engine 218 in FIG. 2. During transmission, a baseband signal supplied from the baseband processor 420 may be translated into an intermediate-frequency (IF) signal. The up-converters 446 may further translate the IF signal to a final radio-frequency (RF) and send it over the air through an antenna array such as the antenna array 411a. For reception, the transceiver 410a, for example, may pass a received RF signal from the antenna array 411a to the down-converters 440.

The down-converters 440 may translate the RF signal into an IF signal. The IF signal may further be translated to a baseband signal to the baseband processor 420, for example. The multiplxer 450 may be responsible for multiplexing receive/transmit signals utilizing either time-division-multiplexing or frequency-domain-multiplexing. The memory 460 may comprise suitable logic, circuitry, interfaces and/or code that may be operable to store information such as executable instructions and data that may be utilized by the baseband processor 420 and/or other associated component units such as the network management engine 430. The memory 360 may comprise RAM, ROM, low latency non-volatile memory such as, for example, flash memory and/or other suitable electronic data storage.

In an exemplary embodiment of the invention, a different control channel between the baseband processer 420 and each of the distributed transceivers 410a through 410N may be utilized for configuring and managing corresponding transceivers. As shown, control channels 412a through 412N are utilized for configuring and managing the transceivers 410a through 410N, respectively. In an exemplary embodiment of the invention, the distributed transceivers 410a through 410N may operate in various modes such as, for example, spatial diversity mode, frequency diversity mode, multiplexing mode and multiple-input-multiple-output (MIMO) mode. In addition, the distributed transceivers 410a through 410N may be configured to switch between spatial diversity mode, frequency diversity mode, multiplexing mode and multiple-input-multiple-output (MIMO) mode based on corresponding propagation environment conditions, link quality, device capabilities, device locations, usage of resources, resource availability, target throughput, application QoS requirements.

In some embodiments of the invention, the interface between the baseband processor 420 and the distributed transceivers 410a through 410N may be different than an analog IF connection. In an exemplary case, the distributed transceivers 410a through 410N may comprise analog-to-digital-converters (ADCs) and digital-to-analog-converters (DACs). In this case, a transceiver such as the distributed transceiver 410a may receive digital bits from the baseband processors 420 through a digital link and use its internal DAC to generate an analog waveform and then to perform the frequency up-conversion and beamforming steps for transmission. Similarly, a transceiver such as the distributed transceiver 410a may receive an RF waveform, down-convert it, and then use its internal ADC to digitize the waveform and send the digital bits over a digital connection/cable to the baseband processor 420. In other embodiments of the invention, the distributed transceivers 410a through 410N may comprise multiple digital processing blocks or units. In this case, a portion of processing within the baseband processor 420 may be moved (in terms of partitioning) to inside the transceivers boundary. In the above embodiments of the invention, one or more digital connections or interfaces between the baseband processor 420 and the distributed transceivers 410a through 410N may be implemented or deployed. The digital connections/interfaces may comprise Ethernet and various memory bus protocols.

In spatial diversity mode, the central baseband processing 420 may be operable to utilize the distributed transceivers 410a through 410N to establish a spatial diversity link with intended end user device such as the end-user application device 220. For example, only a portion of the distributed transceivers 410a through 410N that may have strong propagation channel responses are activated and other transceivers are switched off for power saving. In another example, the distributed transceivers 410a through 410N may be arranged such that the master application device 210 (the transmitter) with available line of sight (LOS) towards the end-user device 220 (the receiver) may be configured to directly beam towards the receiver. In an exemplary embodiment of the invention, each active distributed transceiver may communicate data streams utilizing the same final carrier frequency.

In frequency diversity mode, the central baseband processing 420 may manage the distributed transceivers 410a through 410N similar to spatial diversity mode except that each active distributed transceiver may utilize a different final carrier frequency if such frequency spectrum channel is available. In multiplexing mode, the central baseband processing 420 may manage the distributed transceivers 410a through 410N in such a way that different streams of data may be transmitted through different sets of the distributed transceivers 410a through 410N. For example, in multiplexing mode, different distributed transceivers of the distributed transceivers 410a through 410N may be dynamically programmed such that each transceiver's maximum pattern gain may be pointing to a different direction or reflector. As the environment changes (and hence location of reflectors and end user unit change), the antenna pattern of the distributed transceivers 410a through 410N may be re-adjusted. In MIMO mode, the central baseband processing 420 may manage the distributed transceivers 410a through 410N in such a way that different streams of data may be transmitted through different sets of the distributed transceivers 410a through 410N to a single receiver device such as the end-user application device 220. In an exemplary embodiment of the invention, the central baseband processor 420 may enable transmit beamforming for MIMO transmission such that each transmit data stream may be concurrently transmitted in the same RF band over the full collection of distributed transceivers 410a through 41N to the single end-user application device 220.

Figure 5:
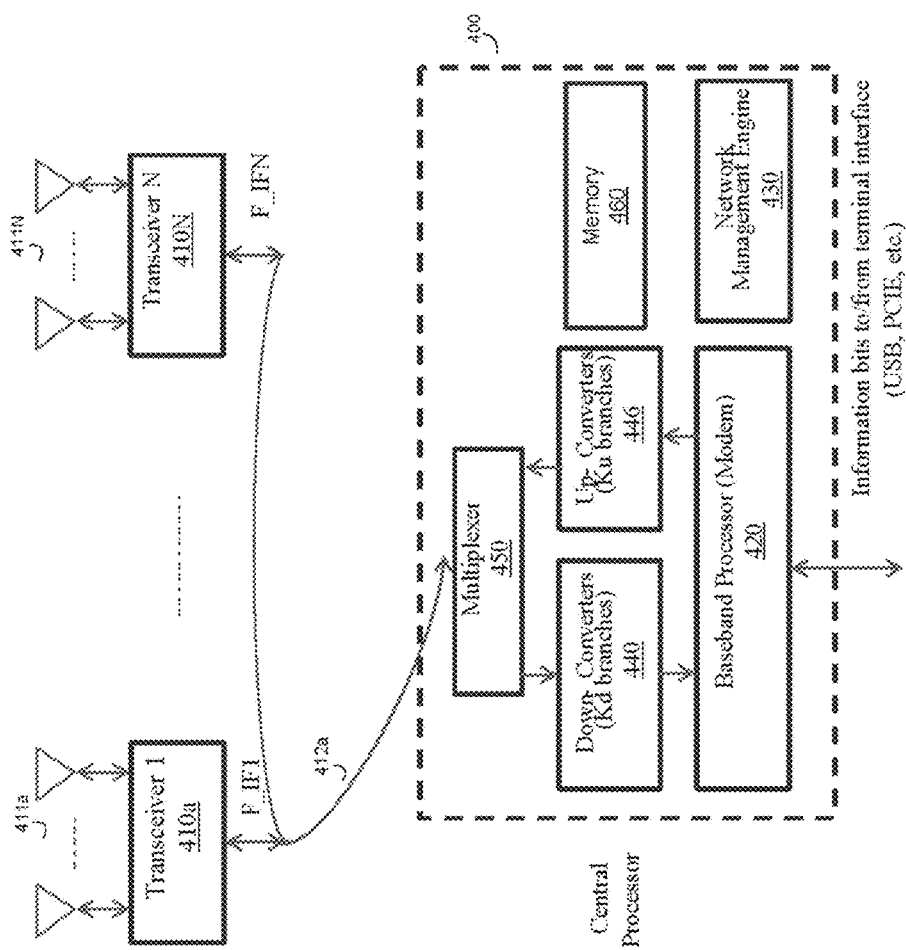
FIG. 5 is a diagram illustrating an exemplary application device with a collection of distributed transceivers that are implemented in a ring topology, in accordance with an embodiment of the invention.

FIG. 5 is a diagram illustrating an exemplary master device with a collection of distributed transceivers that are implemented in a ring topology, in accordance with an embodiment of the invention. As shown, the collection of transceivers 410a through 410N may be connected to the central processor 400 in a ring topology with a single direct cable from the central processor 400 to each of the collection of transceivers 410a through 410N. In this regard, a single control channel between the baseband processor 420 and each of the distributed transceivers 410a through 410N may be utilized for configuring the entire distributed transceivers 410a through 410N as needed. In an exemplary embodiment of the invention, in MIMO mode, the central baseband processor 420 may enable transmit beamforming for MIMO transmission such that each transmit data stream may be concurrently transmitted in the same RF band over the full collection of distributed transceivers 410a through 41N to the single end-user application device 220.

Figure 6:
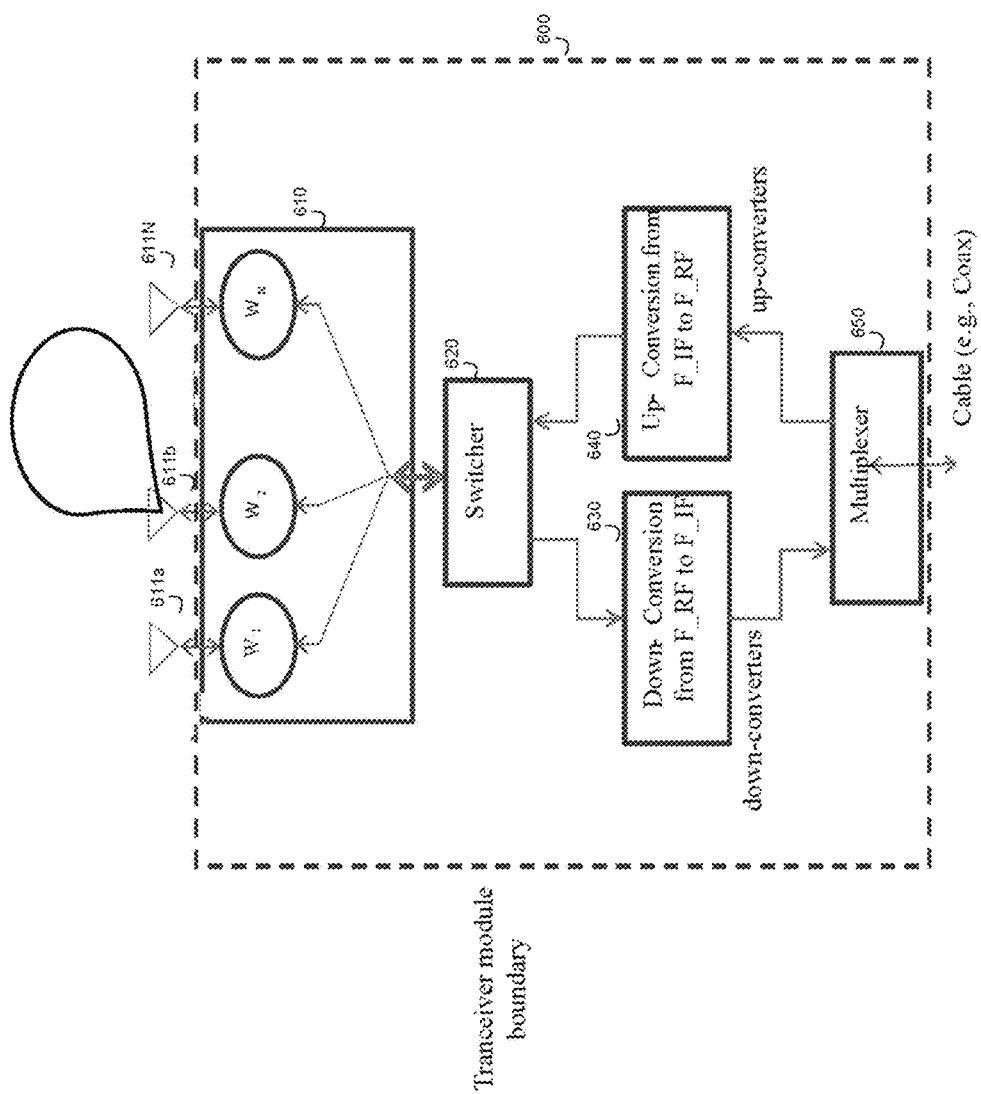
FIG. 6 is a diagram illustrating an exemplary transceiver module with a configurable antenna array, in accordance with an embodiment of the invention.

FIG. 6 is a diagram illustrating an exemplary transceiver module with a configurable phased antenna array, in accordance with an embodiment of the invention. As shown a transceiver 600 that comprises an antenna array 610, a switcher 620, down-converters 630, up-converters 640, and a multiplexer 650.

In an exemplary operation, the antenna array 610 may be a configurable phased antenna array. In this regard, the configurable phased antenna array 610 may have various orientations. Accordingly, the configurable phased antenna array 610 may be utilized to generate a steerable beam pattern to maximize coverage. In an exemplary embodiment of the invention, the switcher 620 may be configured to switch on only the transceivers that have strong propagation channel responses and are activated. Other transceivers may be switched off for power saving. For example, in some instances, the system identifies that transceiver 611a of the configurable phased antenna array 610 has the best LOS link to the receiver end (due to blocking objects in the room or nature of reflectors in the room). In this case, only the transceiver 611a may be switched on by the switcher 620 to transmit data to the receiver end and all other transceivers 611b through 611N of the configurable phased antenna array 610 are switched off for power saving.

Beam patterns of the transceiver 611a may be selected or adjusted in various ways such as, for example, by beam pattern hopping, by correlating beam patterns or configurations with the location of the transceiver 611a, and/or by minimizing the power consumption. In an exemplary embodiment of the invention, in MIMO mode, transmit signals in a baseband may be provided from the central baseband processor 214 by encoding corresponding baseband data streams utilizing space-time coding or space-time-frequency coding. The central baseband processor 214 may initially convert the transmit signals in the baseband into different corresponding IF frequency bands. The transmit signals in the different corresponding IF bands may be fed into the up-converters 640. The up-converters 640 may convert the transmit signals in the different corresponding IF bands to the antenna array 610 in the same RF band for transmission over the air. In an exemplary embodiment of the invention, the antennas 611a-611N of the antenna array 610 may be arranged at different directions or orientations and may be weighted utilizing different set of coefficients $w_1, w_2, \ldots, w_N$ based on corresponding communication environment information. The central baseband processor 214 may perform transmit beamforming such that each of the transmit signals in the same RF band may be concurrently transmitted at different directions over the antennas 611a-611N to the single end-user application device 220.

Figure 7:
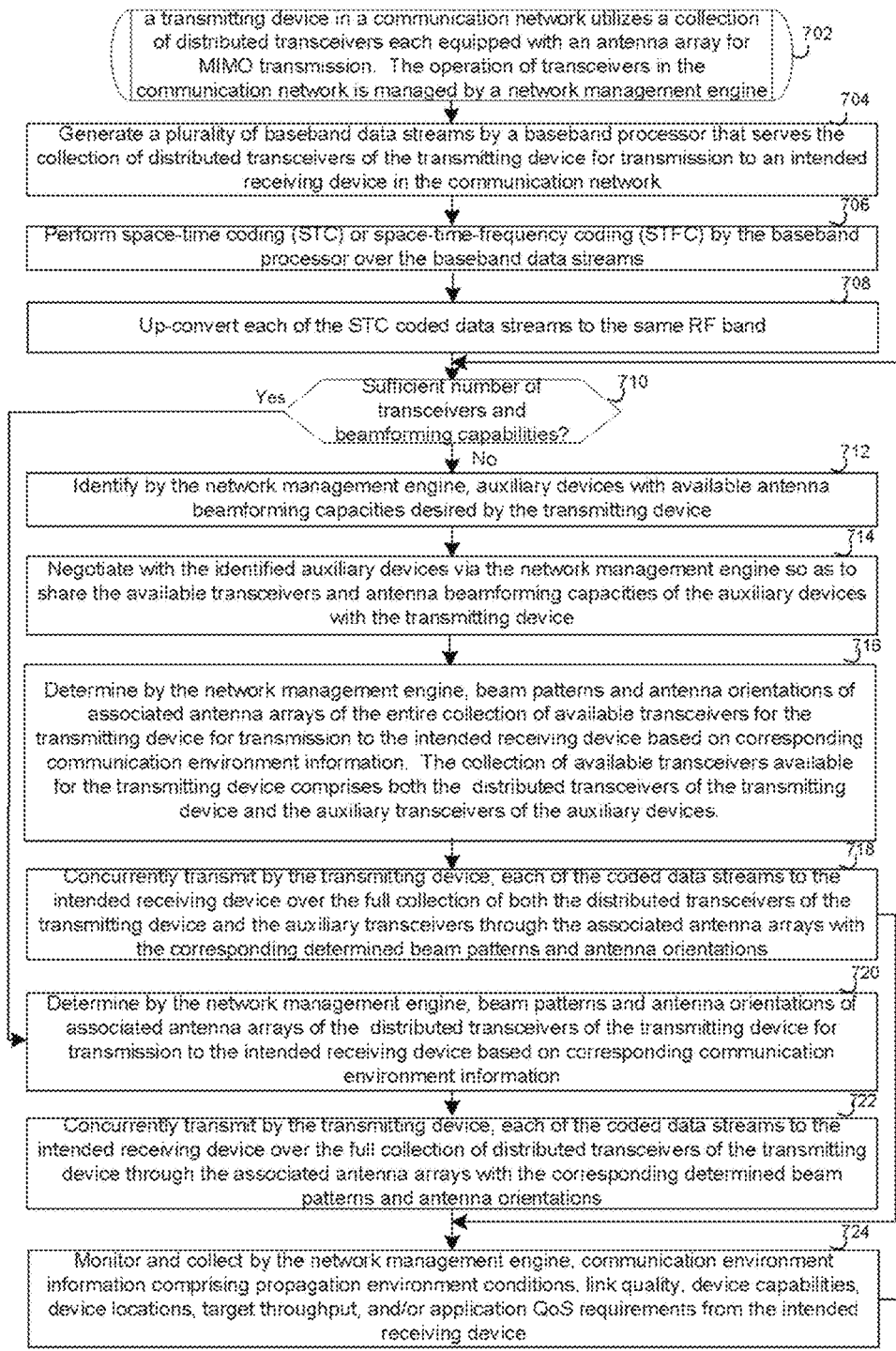
FIG. 7 is a diagram illustrating exemplary steps utilized by a transmitting device for transmit beamforming in MIMO transmission to one receiving device, in accordance with an embodiment of the invention.

FIG. 7 is a diagram illustrating exemplary steps utilized by a transmitting device for transmit beamforming in MIMO transmission to one receiving device, in accordance with an embodiment of the invention. Referring to FIG. 7, in step 702, a transmitting device such as the master application device 210 in the communication network 100 utilizes a collection of distributed transceivers 212a through 212e each equipped with an antenna array for MIMO transmission. The operation of the entire collection of transceivers in the communication network 100 may be managed and controlled by a network management engine such as the network management engine 216.

The exemplary steps start with step 704, where the central baseband processor 214, which serves or manages the collection of distributed transceivers 212a-121e of the transmitting device (the master application device 210), may be operable to generate a plurality of data streams at baseband for transmission to an intended receiving device such as the end-user application device 220 in the communication network 100. In step 706, the central baseband processor 214 may perform diversity coding such as, for example, space-time coding (STC) or space-time-frequency coding (STFC) over the generated data streams in the baseband. In step 708, the central baseband processor 214 may convert the resulting coded data streams into different corresponding IF frequency bands to be fed into the up-converters 446, for example. The up-converters 446 may convert the coded data streams in the different corresponding IF bands into the same RF band for transmission over the air.

In step 710, it may be determined whether the master application device 210 comprises sufficient number of transceivers and antenna beamformers to support the MIMO transmission of the coded data streams in the different corresponding IF bands. In instances where the master application device 210 does not comprise sufficient number of transceivers and antenna beamformers for the MIMO transmission of the coded data streams in the different corresponding IF bands, then in step 712, the network management engine 216 may identify one or more auxiliary devices that may provide desired communication capacities such as, for example, a number of transceivers and antenna beamformers available to the master application device 210 for sharing. In step 714, the master application device 210 may negotiate via the network management engine 216 with each of the auxiliary devices such as the end-user application device 250 for sharing the available number of transceivers and antenna beamformers of the end-user application device 250.

In step 716, the network management engine 216 may determine beam patterns and antenna orientations of associated antennas or antenna arrays of the entire collection of available transceivers for the master application device 210 (the transmitting device) for transmission to the end-user application device 220 based on corresponding communication environment information. The collection of available transceivers available for the master application device 210 comprises both the distributed transceivers 212a-121e of the master application device 210 and the auxiliary transceivers of the identified auxiliary devices. In step 718, the master application device 210 may be enabled to concurrently transmit each of the coded data streams to the end-user application device 220 in the same RF band over the full collection of the available transceivers for the master application device 210 through the associated antenna arrays with the determined beam patterns and antenna orientations. The exemplary steps may continue in step 724, where the network management engine 216 may monitor and collect corresponding communication environment information such as, for example, propagation environment conditions, link quality, device capabilities, device locations, target throughput, and/or application QoS requirements from the end-user application device 220. The exemplary steps may return to step 710.

In step 710, in instances where the master application device 210 comprises a sufficient number of transceivers and antenna beamformers for the MIMO transmission of the coded data streams in the different corresponding IF bands, the exemplary steps may continue in step 720, where the network management engine 216 may determine beam patterns and antenna orientations for associated antenna arrays of the distributed transceivers of the master application device 210 for transmission to the end-user application device 220 based on corresponding communication environment information. In step 724, the master application device 210 may be enabled to concurrently transmit each of the coded data streams in the same RF band to the end-user application device 220 over the full collection of the distributed transceivers of the master application device 210 through the associated antenna arrays with the corresponding determined beam patterns and antenna orientations. The exemplary steps continue in step 724.

Aspects of a method and system for MIMO transmission in a distributed transceiver network are provided. In accordance with various exemplary embodiments of the invention, as described with respect to FIG. 1 through FIG. 7, a transmitting device such as the master application device 210 may comprise a plurality of distributed transceivers 212a-212e, the central baseband processor 214 and the network management engine 216. For transmission, the central baseband processor 214 may be operable to generate a plurality of data streams at baseband such as at cellular baseband. The central baseband processor 214 may perform diversity coding such as, for example, space-time coding or space-time-frequency coding over the generated data streams in the baseband.

The master application device 210 may be enabled to concurrently transmit each of the resulting coded streams in a same radio frequency band over the plurality of distributed transceivers 212a-212e through associated antennas to a receiving device such as the end-user application device 220. The central baseband processor 214 may convert the coded data streams in the baseband into different corresponding IF bands to be fed into the up-converters 640, for example. The up-converters 640 may further convert the coded data streams in the different corresponding IF bands into the same radio frequency band for transmission over the air. The network management engine 216 may determine corresponding beam patterns and antenna orientations in the same radio frequency band for the associated antennas of the plurality of distributed transceivers 212a-212e of the master application device 210.

The master application device 210 may be enabled to concurrently transmit each of the coded streams in the same radio frequency band to the end-user application device 220 over the plurality of distributed transceivers 212a-212e through associated antennas with the determined corresponding beam patterns and antenna orientations. In some instances, the master application device 210 does not comprise sufficient number of transceivers and antenna beamformers to support the MIMO transmission of the coded data streams. In this regard, the network management engine 216 may identify one or more auxiliary devices that may provide the desired number of transceivers and antenna beamformers available for sharing. The master application device 210 may negotiate, via the network management engine 216, with each of the identified auxiliary devices such as the end-user application device 250 for sharing the available number of transceivers and antenna beamformers of the end-user application device 250. The network management engine 216 may determine corresponding beam patterns and antenna orientations for associated antennas of the transceivers available for the master application device 210. The master application device 210 may be enabled to concurrently transmit each of the coded data streams to the end-user application device 220 in the same radio frequency band over the full collection of the available transceivers for the master application device 210 through the associated antennas with the determined corresponding beam patterns and antenna orientations. The network management engine 216 may monitor and collect corresponding communication environment information during the concurrent transmission.

In some embodiments of the invention, the antenna elements within the distributed transceiver 222-224 may be used as independent antenna elements for MIMO implementation. In this case, all the antenna elements 222a-222m and 224a-224n may be considered as independent antennas available for MIMO implementation and processing by the baseband processor 226. This embodiment may enable a super-MIMO configuration that offers a larger MIMO size (e.g., equal to sum of number of antennas in all the transceivers). Subsequently, MIMO techniques such as space-time coding (STC), beamforming, or space-time-frequency coding (STFC) may be applied to the larger MIMO dimensions. In this regard, multiple data streams may be needed to be transported to each transceiver module to represent the MIMO coded data streams assigned to each antenna within the transceiver. This may be supported by using multiple cables between the baseband processor 226 and each of the transceivers or using a single cable and multiplexing different data streams over different IF frequencies.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for MIMO transmission in a distributed transceiver network.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of processing signals, the method comprising:
   in a first communication device that comprises a plurality of distributed transceivers, each distributed transceiver of the first communication device comprising an antenna array comprising a plurality of antennas, and a plurality of baseband processors, each baseband processor associated with a different set of distributed transceivers in the plurality of distributed transceivers:
      generating, at baseband, a data stream in a plurality of data streams by each of the plurality of baseband processors for transmission to a second communication device that comprises a plurality of distributed transceivers, each distributed transceiver of the second communication device comprising an antenna array comprising a plurality of antennas;
      selecting antenna patterns for the antenna arrays of the transceivers of the first communication device to perform beamforming between the antenna arrays of the transceivers of the first and second communication devices; and
      concurrently transmitting the data stream generated by each of the plurality of baseband processors, in a same carrier frequency, from the first communication device to the second communication device by performing beamforming between the antenna arrays of said plurality of distributed transceivers of the first and second communication devices using the selected antenna patterns.

2. The method according to claim 1 further comprising converting said data streams at said baseband to different corresponding intermediate frequencies.

3. The method according to claim 2 further comprising converting said data streams in said different corresponding intermediate frequencies into said same carrier frequency.

4. The method according to claim 1 further comprising identifying one or more auxiliary devices that provide one or more auxiliary transceivers to said first communication device for said concurrently transmitting, each auxiliary transceiver comprising an antenna array comprising a plurality of antennas.

5. The method according to claim 4 further comprising determining corresponding beam patterns and antenna orientations in said same carrier frequency for said:
   antennas of said plurality of distributed transceivers of said first communication device; and
   antenna arrays of said one or more auxiliary transceivers of said one or more auxiliary devices.

6. The method according to claim 5 further comprising concurrently transmitting each of said data streams in said same carrier frequency to said second communication device over said plurality of distributed transceivers of said first communication device and said one or more auxiliary transceivers of said one or more auxiliary devices utilizing said determined corresponding beam patterns and antenna orientations.

7. The method according to claim 1 further comprising:
   monitoring and collecting communication environment information corresponding to said concurrent transmission,
   wherein selecting the antenna patterns for the antenna arrays of the transceivers of the first devices comprises utilizing the collected communication environment information.

8. The method according to claim 1 further comprising:
   exchanging and negotiating system configurations between the first and second communication devices,
   wherein selecting antenna patterns for the antenna arrays of the transceivers of the first communication device comprises utilizing said system configurations.

9. The method according to claim 8, wherein the system configurations comprise one or more of (i) a number of transceivers, (ii) a number of antennas in antenna arrays of each transceiver, (iii) antenna beamformers, (iv) measured channel responses, (v) a sequence of antenna array coefficients for antenna arrays of each transceiver, and (vi) a location of each of the first and second communication devices.

10. The method according to claim 8, wherein exchanging and negotiating of system configurations between the first and second communication devices comprises:
   establishing a feedback channel between the first and second communication devices; and
   exchanging and negotiating of system configurations through the established feedback channel.

11. The method according to claim 1 further comprising:
  determining a change in at least one of (i) propagation environment conditions, (ii) link quality, (iii) device locations, and (iv) target throughput; and
  changing the antenna patterns for the antenna arrays of the transceivers of the first communication device based on the determined change.

12. The method according to claim 1, further comprising configuring the distributed transceivers of the first communication device to transmit in one of (i) a multiple-input multiple-output (MIMO) mode (ii) a spatial diversity mode, (iii) a frequency diversity mode, and (iv) a multiplexing mode.

13. A first communication device comprising:
  a plurality of distributed transceivers, each distributed transceiver of the first communication device comprising an antenna array comprising a plurality of antennas;
  a plurality of baseband processors, each baseband processor associated with a different set of distributed transceivers in the plurality of distributed transceivers of the first communication device; and
  a network management engine;
  each baseband processor configured to generate a data stream at baseband for transmission to a second communication device that comprises a plurality of distributed transceivers, each distributed transceiver of the second communication device comprising an antenna array comprising a plurality of antennas;
  the network management engine configured to select antenna patterns for the antenna arrays of transceivers of the first communication device to perform beamforming between the antenna arrays of the transceivers of the first and second and communication devices; and
  each transceiver of the first communication device configured to concurrently transmit, with other transceivers in the plurality of transceivers of the first communication device, the data stream generated by the associated baseband processor, in a same carrier frequency, to the second communication device by performing beamforming between the antenna arrays of the plurality of transceivers of the first and second communication devices using the antenna patterns selected by the network management engine.

14. The first communication device according to claim 13, wherein each baseband processor is further configured to convert the corresponding data stream at said baseband to different corresponding intermediate frequencies.

15. The first communication device according to claim 14, wherein each baseband processor is further configured to convert the corresponding data stream in said different corresponding intermediate frequencies into said same carrier frequency.

16. The first communication device according to claim 13, wherein the network management engine is further configured to identify one or more auxiliary devices that provide one or more auxiliary transceivers to said first communication device for said concurrently transmitting, each auxiliary transceiver comprising an antenna array comprising a plurality of antennas.

17. The first communication device according to claim 16, wherein said network management engine is further configured to determine corresponding beam patterns and antenna orientations in said same radio frequency band for said:
  antennas arrays of said plurality of distributed transceivers of said first communication device; and
  antenna arrays of said one or more auxiliary transceivers of said one or more auxiliary devices.

18. The first communication device according to claim 17, wherein the plurality of distributed transceivers of the first communication device and the one or more auxiliary transceivers of the one or more auxiliary devices are configured to concurrently transmit each of said data streams in said same carrier frequency to said second communication device utilizing said determined corresponding beam patterns and antenna orientations.

19. The first communication device according to claim 13, wherein the network management engine is further configured to:
  monitor and collect communication environment information corresponding to said concurrent transmission,
  wherein selecting the antenna patterns for the antenna arrays of the transceivers of the first communication device comprises utilizing the collected communication environment information.

20. The first communication device according to claim 13, the network management engine further configured to:
  exchange and negotiate system configurations between the first and second communication devices,
  wherein selecting antenna patterns for the antenna arrays of the transceivers of the first communication device comprises utilizing said system configurations.

21. The first communication device according to claim 20, wherein the system configurations comprise one or more of (i) a number of transceivers, (ii) a number of antennas in antenna arrays of each transceiver, (iii) antenna beamformers, (iv) measured channel responses, (v) a sequence of antenna array coefficients for antenna arrays of each transceiver, and (vi) a location of each of first and second communication devices.

22. The first communication device according to claim 20, wherein exchanging and negotiating of system configurations between the first and second communication devices comprises:
  establishing a feedback channel between the first and second communication devices; and
  exchanging and negotiating of system configurations through the established feedback channel.

23. The first communication device according to claim 13, the network management engine further configured to:
  determine a change in one of (i) propagation environment conditions, (ii) link quality, (iii) device locations, and (iv) target throughput; and
  change the antenna patterns for the antenna arrays of the transceivers of the first communication device based on the determined change.

24. The first communication device according to claim 13, the network management engine further configured to configure the distributed transceivers of the first communication device to transmit in one of (i) a multiple-input multiple-output (MIMO) mode (ii) a spatial diversity mode, (iii) a frequency diversity mode, and (iv) a multiplexing mode.

* * * * *